United States Patent [19]

Venema

[11] Patent Number: 5,709,929
[45] Date of Patent: Jan. 20, 1998

[54] PLASTIC SHEET, A PROCESS FOR THE MANUFACTURE THEREOF AND FORMED ARTICLES CONTAINING THE SHEET

[75] Inventor: Gertjan Venema, Pittem, Belgium

[73] Assignee: Axxis N.V., Tielt, Belgium

[21] Appl. No.: 508,336

[22] Filed: Jul. 27, 1995

Related U.S. Application Data

[63] Continuation of Ser. No. 141,660, Oct. 26, 1993, abandoned.

[30] Foreign Application Priority Data

Oct. 26, 1992 [BE] Belgium ............... 9200923

[51] Int. Cl.$^6$ .............. B32B 27/06; B32B 27/18; B32B 27/36; B32B 31/00
[52] U.S. Cl. ............ 428/215; 428/334; 428/480; 528/307; 528/308; 528/308.6; 528/308.7; 524/91; 524/359; 156/244.11; 156/297; 156/308.2; 264/173.16; 264/175
[58] Field of Search ................. 428/480, 483, 428/910, 334, 215; 528/307, 308, 308.1, 308.6, 308.7; 156/244.11, 297, 308.2; 264/172.19, 173.1, 173.16, 175, 280, 291, 299; 524/94, 91, 359

[56] References Cited

U.S. PATENT DOCUMENTS

| | | | |
|---|---|---|---|
| 4,041,206 | 8/1977 | Tsunashima et al. | 428/409 |
| 4,265,804 | 5/1981 | Zannucci et al. | 260/45.8 NT |
| 4,291,152 | 9/1981 | Inata et al. | 528/289 |
| 4,355,080 | 10/1982 | Zannucci | 428/483 |
| 4,446,262 | 5/1984 | Okumura et al. | 524/89 |
| 4,859,726 | 8/1989 | Wang et al. | 524/91 |
| 4,954,541 | 9/1990 | Nakane et al. | 524/86 |
| 4,983,653 | 1/1991 | Fukuda et al. | 524/91 |
| 4,983,711 | 1/1991 | Sublett et al. | 528/272 |
| 4,985,538 | 1/1991 | Fukuda et al. | 528/305 |
| 5,032,631 | 7/1991 | Golder et al. | 524/101 |
| 5,079,284 | 1/1992 | Nakane et al. | 524/97 |
| 5,095,098 | 3/1992 | McLain et al. | 534/15 |
| 5,124,435 | 6/1992 | Mori et al. | 528/307 |
| 5,139,885 | 8/1992 | Nakane et al. | 428/378 |
| 5,234,681 | 8/1993 | Yoshida et al. | 424/59 |
| 5,251,064 | 10/1993 | Tennant et al. | 359/361 |
| 5,264,539 | 11/1993 | Shepherd | 528/272 |
| 5,480,926 | 1/1996 | Fagerburg et al. | 524/86 |

FOREIGN PATENT DOCUMENTS

| | | |
|---|---|---|
| 1096534 | 10/1978 | Canada. |
| 368637 | 5/1990 | European Pat. Off.. |
| 411136 | 2/1991 | European Pat. Off.. |

OTHER PUBLICATIONS

Search Report (May 1993.

*Primary Examiner*—Paul J. Thibodeau
*Assistant Examiner*—Vivian Chen
*Attorney, Agent, or Firm*—Cushman Darby & Cushman IP Group of Pillsbury Madison & Sutro, LLP

[57] ABSTRACT

A multi-layered plastic sheet comprising of a first layer composed of a copolymer obtained by reacting a dimethyl terephthalate or terephthalic acid with a mixture of 99–55 mole % ethylene glycol and 1–45 mole % cyclohexane dimethanol wherein the first layer is covered on at least one surface with a 2 to 100 μm thick UV-absorbing second layer composed of the copolymer of the first layer and a UV-absorbing additive. The UV-absorbing additive can be a benzophenone compound or a benzotriazole compound.

21 Claims, No Drawings

PLASTIC SHEET, A PROCESS FOR THE MANUFACTURE THEREOF AND FORMED ARTICLES CONTAINING THE SHEET

This is a continuation of application Ser. No. 08/141,660, filed on Oct. 26, 1993, abandoned.

FIELD OF THE INVENTION

The invention relates to a plastic sheet containing a copolymer, which copolymer is obtainable by reacting dimethyl terephthalate or terephthalic acid with a mixture of 99–55 mole % ethylene glycol and 1–45 mole % cyclohexane dimethanol.

BACKGROUND OF THE INVENTION

Such a sheet is known from U.S. Pat. No. 4,355,080.

An advantage of such a sheet is that the use of the copolymer imparts to the sheet high toughness and, if the sheet is of a transparent type, a high degree of transparency, which high toughness and high transparency are wholly or almost wholly retained when the plastic sheet is formed into an end product at elevated temperature.

A disadvantage, however, is that the copolymer exhibits poor weatherability. The sheet, on exposure to weather conditions, becomes less transparent, yellow and brittle, so that the sheet is not suited for use in outdoor applications such as glazing for buildings and greenhouses, noise barriers, advertising boards and guards.

DE-A-2,853,631 shows that it is not possible to improve the weatherability of such a copolymer with a relatively low cyclohexane dimethanol content by adding a UV light-absorbing additive.

The United States patent mentioned above therefore proposes to laminate the sheet with an acrylic film so as to improve the weatherability, the acrylic film optionally containing a UV light-absorbing additive.

A disadvantage hereof is that bonding problems may arise between the acrylic film and the sheet, rendering the sheet unfit for use. It is true that EP-A-320632 describes a plastic sheet to which is applied a layer containing a plastic and a UV light-absorbing additive, but the plastic is different from the copolymer contained in the sheet according to the invention. Furthermore it is well-known that the addition of an UV-absorber to the polymers presented in EP-A-320632 gives good results, in contrast with the polymer of the present invention.

SUMMARY OF THE INVENTION

The invention aims to provide a sheet that does not have the disadvantage referred to above. Surprisingly, this is accomplished as a result of there being present at at least one surface of the sheet a 2 to 100-µ layer also containing the copolymer and a UV light-absorbing additive. The sheet according to the invention exhibits good weatherability without the disadvantage of the bonding problems of the known sheet.

A further advantage of the sheet according to the invention is that such a sheet can be formed into end products in a simple manner at elevated temperature, whilst with the known sheet this is made difficult by the presence of the acrylic film.

Yet another advantage is that the sheet according to the invention can readily be recycled whilst the known sheet is very difficult to recycle, if at all, inasmuch as the sheet contains two different plastics.

DETAILED DESCRIPTION OF THE INVENTION

The term sheet as used in this application means a body whose thickness is only small in relation to its length and width. The term sheet should be taken to include film, foil, and so forth as well. The term sheet should also be taken to include twin wall sheet. The sheet may be flat or curved. By sheet surfaces is meant the two outer faces of the sheet that are perpendicular to the direction of the thickness.

The copolymer contained in the sheet is preferably obtainable by reacting dimethyl terephthalate or terephthalic acid with a mixture of 98–60 mole % ethylene glycol and 2–40 mole % cyclohexane dimethanol. The copolymer contained in the sheet is more preferably obtainable by reacting dimethyl terephthalate or terephthalic acid with a mixture of 97–66 mole % ethylene glycol and 3–34 mole % 1,4-cyclohexane dimethanol. Such a sheet possesses good mechanical properties and, if it is of a transparent type, a high degree of luminous transmittance.

The copolymer contained in the sheet is more preferably obtainable by reacting dimethyl terephthalate or terephthalic acid with a mixture of 95–70 mole % ethylene glycol and 5–30 mole % cyclohexane dimethanol. In principle, any UV light-absorbing additive suited for use in thermoplastic polyesters or copolyesters may be employed in the sheet according to the invention, such as those mentioned in DE-A-2853631, EP-A-247480, EP-A-320632 and Plastics Additives Handbook, 3rd edition, Hanser Publishers, of Munich, (1990) page 176 and following pages.

A benzotriazole or a benzophenone is preferably employed as UV light-absorbing additive.

2-Hydroxyphenyl benzotriazoles with the general formula (1), for instance, may be used.

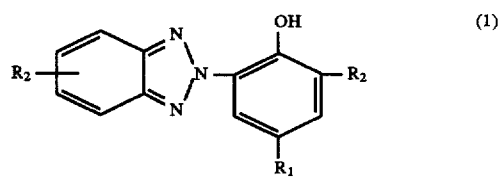

In formula(1):

R$^1$ is an alkyl group containing 1–18 C atoms or an aryl alkyl group containing 18 C atoms.

R$^2$ is a hydrogen atom or a chlorine atom or an alkyl group containing 1–18 C atoms or an aryl alkyl group containing 7–18 C atoms. Examples of benzophenones that are suited for use in the sheet according to the invention are represented by the general formula (2)

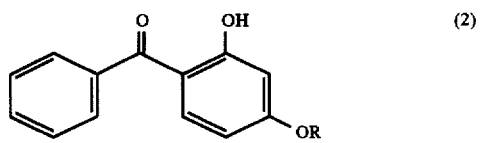

wherein R is a hydrogen atom or an alkyl group containing 1–12 C atoms.

Preferably, a benzotriazole whose molecules contain 2 benzotriazole groups is used in the sheet according to the invention, for instance a benzotriazole group with the general formula (3).

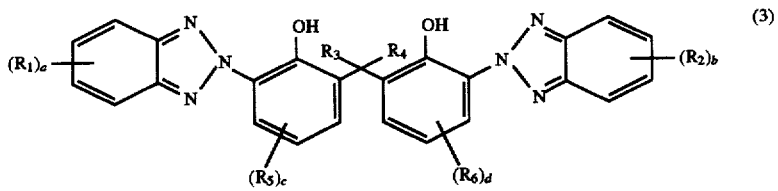

In formula(3)

R¹ and R², which may be either the same or different, are a hydrogen atom or a halogen atom, an alkyl group containing 1–10 C atoms, a cycloalkyl group containing 5–10 C atoms, an aryl alkyl group containing 7–13 C atoms, an aryl group containing 6–14 C atoms, —OR⁷ or COOR⁷.

R⁷ is a hydrogen atom or an alkyl group containing 1–10 C atoms, a cycloalkyl group containing 5–10 C atoms, an aryl alkyl group containing 7–13 C atoms or an aryl group containing 6–14 C atoms.

R³ and R⁴, which may be either the same or different, are a hydrogen atom, an alkyl group containing 1–15 C atoms, a cycloalkyl group containing 5 or 6 C atoms, an aryl alkyl group containing 7–20 C atoms or an aryl group containing 6–14 C atoms.

R⁵ and R⁶, which may be either the same or different, are an alkyl group containing 2–15 C atoms, a cycloalkyl group containing 5–10 C atoms, an azyl alkyl group containing 7–20 C atoms, an aryl group containing 6–14 C atoms, —OR⁷ or —COOR⁷.

a and b, which may be the same or different, are 1, 2, 3 or 4.

c and d, which may be the same or different, are 1, 2 or 3.

The benzotriazoles whose molecules contain 2 benzotriazole groups have a high molecular weight and, hence, evaporate or migrate less rapidly from the plastic sheet than the UV light-absorbing additives which have a lower molecular weight.

The layer containing the copolymer and the UV light-absorbing additive may be present at only one surface of the sheet. In that case, however, only the surface where the layer containing the copolymer and the UV light-absorbing additive is present should be exposed to the weather.

It is preferred for the layer containing the copolymer and the UV light-absorbing additive to be present at both surfaces of the plastic sheet.

The layer containing the copolymer and the UV light-absorbing additive generally contains 0.5–20% by wt. of UV light-absorbing additive. The layer preferably contains 1–15, and more preferably 2–10% by wt. of UV light-absorbing additive.

The plastic sheet is produced by any one of the processes known in plastics technology. For instance, the sheet may be produced by extruding or calendering a sheet containing the copolymer and pressing onto the sheet, just before it cools down, a 2–100-μ film containing the copolymer and the UV light-absorbing additive. It is also possible to apply to the sheet a layer of a solution containing the copolymer and the UV light-absorbing additive and then allow the solvent to evaporate. The plastic sheet is preferably produced by coextruding in a single step the layer or the layers containing the copolymer and the UV light-absorbing additive and the remaining part of the sheet. Such a plastic sheet exhibits good optical properties and there exists a good bond between the layers and the remaining part of the sheet. Preferably the thickness of the layer is 3–50μ, more preferably 5–40μ.

The plastic sheet may contain the usual additives such as lubricants, antioxidants, optically active additives and colorants. In addition, if it is of a non-transparent type, the plastic sheet may contain, for instance, pigments, fillers and fibres.

The plastic sheet may be processed into shaped articles for instance by forming the plastic sheet at elevated temperature, by bending or folding at ambient temperature and, optionally, machining, for instance cutting and sawing.

The invention also relates to shaped articles wholly or partially produced from the sheet according to the invention, such as riot shields, visors, covers, skylights, glazing in greenhouses, noise barriers and buildings, and advertising boards.

EXAMPLES 1, 2 AND COMPARATIVE EXAMPLE A, B, C

Compounds were prepared by melting ethylene-1,4 cyclohexylene dimethylene terephthalate (Kodar PETG® 6763, supplied by Eastman of the U.S.A.) in the usual manner in a twin-screw kneader and mixing it with a UV light-absorbing additive.

The compositions of the compounds were as follows:

compound 1: 93% by wt. PETG 6763, 7% by wt. 2-(2H-benzotriazole-2-yl)-4,6-bis-(1-methyl-1-phenyl ethyl) phenol (Tinuvin®234, supplied by Ciba Geigy of Switzerland).

compound 2: 95% by wt. PETG 6763, 5% by wt. bis(2-hydroxy-5-t-octyl-3-(benzotriazole-2-yl)phenyl)-methane (Mixxim® BB/100, supplied by Claus Huth GmbH of Germany).

Plastic sheets 4 mm thick and 1250 mm wide were coextruded, comprising a core layer of substantially the nominal thickness and at either surface a surface layer of about 40μ.

The core layer consisted of 100% PETG 6763. Both surface layers of plastic sheet 1 consisted of compound 1 whilst both surface layers of plastic sheet 2 consisted of compound 2. In addition plastic sheets A, B and C were extruded without the surface layers. The thickness of sheet A was 4 mm and the sheet consisted solely of PETG 6763. The thickness of sheet B was 0.75 mm and the sheet consisted at 0.3% by wt. bis(2-hydroxy-5-t-octyl-3-(benzotriazol-2-yl)phenyl)-methane and 99.7% PETG 6763. The thickness of sheet C was 4 mm and the sheet consisted of 0.02% by weight bis-(2-hydroxy-5-t-octyl-3-(benzotriazol-2-yl)phenyl)-methane and 99.98 PETG 6763. The plastic sheets 1, 2 and A were subjected to the following tests:

1) Accelerated weathering in a QUV Accelerated Weathering tester (R), supplied by The Q-Panel Company of the USA, equipped with QUV-B313 lamps. The exposure times were 500 and 1000 hours. The weathering cycle was comprised of 4 hours' UV irradiation at 60° C. alternated with 4 hours' condensation at 50° C.

Before and after weathering, the yellowness index (YI) was measured according to ASTM D 1925, the luminous transmittance (LT) and the impact resistance by the falling weight impact measurement according to ASTM D 3029. The falling weight impact test was conducted using a Dynatup 8250 Impactor (R) supplied by Dynatup of the U.S.A., fitted with a spherical tup with a diameter of 12.7 mm. The impact energy was 135.6 J. The impact velocity was 3.39 m/s. The maximum load energy (MLE) was taken as a measure of the impact resistance.

Accelerated weathering in a Xenon Weather-Ometer® supplied by Atlas of the USA. The radiation intensity was 0.35 W/m$^2$ at a wavelength of 340 nm. Borosilicate/borosilicate filters were installed. The blackpanel temperature was 63° C. The weathering cycle comprised 102 minutes' dry exposure alternated with 18 minutes' wet exposure. The exposure times were 1000, 2000 and 3000 hours. The YI and the LT were measured before and after weathering.

3) Natural weathering by placing the plastic sheets out in the open in accordance with DIN 53386 at Tielt (Belgium). The YI and the LT were measured before and after weathering.

The results for plastic sheets 1 and 2 according to the invention and plastic sheet A without the surface layers are given in Tables 1–3.

TABLE 1

Results before and after weathering in QUV Accelerated Weathering Tester

| Plastic sheet | Hours exposed | | |
|---|---|---|---|
| | 0 hours | 500 hours | 1000 hours |
| | YI (–) | | |
| A | 3.5 | 9.0 | 12.0 |
| 1 | 5.1 | 4.7 | 5.8 |
| 2 | 5.2 | 5.7 | 5.4 |
| | LT (%) | | |
| A | 84 | 82 | 79 |
| 1 | 84 | 82 | 82 |
| 2 | 84 | 83 | 83 |
| | MLE (J) | | |
| A | 45 | 5 | — |
| 1 | 45 | 41 | — |
| 2 | 45 | 41 | — |

The YI, LT and MLE of the plastic sheets according to the invention appear to be hardly affected, if at all, by the weathering treatment, in contrast with the plastic sheet without the surface layer, which strongly yellows, becomes less transparent and embrittles rapidly.

The YI of the sheets according to the invention is admittedly at a somewhat higher level, but the value remains constant during use of the sheets. This latter aspect is determining for the applicability of the sheets.

TABLE 2

Results before and after weathering in Xenon Weather-Ometer

| Plastic sheet | Hours exposed | | | |
|---|---|---|---|---|
| | 0 hrs | 1000 hrs | 2000 hrs | 3000 hrs |
| | YI (–) | | | |
| A | 3.5 | 10.3 | 12.3 | 14.0 |
| 1 | 5.1 | 3.9 | 4.2 | 5.1 |
| 2 | 5.2 | 4.3 | 4.6 | 4.8 |

TABLE 2-continued

Results before and after weathering in Xenon Weather-Ometer

| Plastic sheet | Hours exposed | | | |
|---|---|---|---|---|
| | 0 hrs | 1000 hrs | 2000 hrs | 3000 hrs |
| | LT (%) | | | |
| A | 84 | 82 | 80 | 78 |
| 1 | 84 | 84 | 84 | 83 |
| 2 | 84 | 84 | 84 | 84 |

The YI and the LT of the plastic sheets according to the invention appear to be hardly affected, if at all, by the weathering treatment, in contrast with the plastic sheet without the surface layer, which strongly yellows and becomes less transparent. Furthermore, after weathering for a brief period, the plastic sheet without the surface layer developed a pronounced haze whilst this was hardly the case, if at all, with the plastic sheets according to the invention.

TABLE 3

Results before and after natural weathering

| Plastic sheet | Time exposed | |
|---|---|---|
| | 0 year | 0.5 year |
| | YI (–) | |
| A | 3.0 | 9.6 |
| 1 | 4.5 | 4.0 |
| 2 | 5.0 | 4.2 |
| | LT (%) | |
| A | 84 | 83 |
| 1 | 84 | 84 |
| 2 | 84 | 84 |
| | MLE (J) | |
| A | 45 | 6 |
| 2 | 45 | 42 |

The YI-LT and the MLE of the plastic sheets according to the invention appear to be hardly affected, if at all, by the weathering treatment, in contrast with the plastic sheet without the surface layer, which strongly yellows, becomes less transparent and becomes brittle.

The plastic sheets B and C were subjected to the test in the QUV Accelerated Weathering Tester.

TABLE 4

Results before and after weathering in the QUV Accelerated Weathering Tester

| Plastic sheet | Hours exposed | | |
|---|---|---|---|
| | 0 hrs | 500 hrs | 1000 hrs |
| | YI (–) | | |
| B | 11.9 | 13.9 | 14.2 |
| C | 11.6 | — | — |
| | LT (%) | | |
| B | 87.5 | 84.8 | 84.1 |
| C | 81.7 | — | — |

From these results, it can be seen that, even the initial YI of both sheet B and C being as bad as the YI of the 1000h QUV-weathered sheet A (table 1). The sheets B and C are commercially valueless.

The QUV-Accelerated Weathering results for sheet B further show that, upon 500 h and 1000 h exposure, the YI increases further and to a much higher extend than the sheets according to the invention, comprising the surface layer.

What we claimed is:

1. A multi-layered plastic sheet comprising
   a first layer having a first and second surface, wherein said first layer comprises a copolymer prepared by the reaction of dimethyl terephthalate or terephthalic acid with a mixture comprising about 99–55 mole % ethylene glycol and about 1–45 mole % 1,4-cyclohexane dimethanol, and
   a second layer which covers at least the first surface of said first layer, wherein said second layer comprises said copolymer of said first layer and a UV light-absorbing additive, and said second layer has a thickness between about 2 μm and about 100 μm.

2. A multi-layered plastic sheet according to claim 1, wherein said mixture comprises about 98–60 mole % ethylene glycol and about 2–40 mole % 1,4-cyclohexane dimethanol.

3. A multi-layered plastic sheet according to claim 1, wherein said mixture comprises about 97–66 mole % ethylene glycol and about 3–34 mole % 1,4-cyclohexane dimethanol.

4. A multi-layered sheet according to claim 3, wherein said UV light-absorbing additive is bis-(2-hydroxy-5-t-octyl-3-(benzotriazole-2-yl)phenyl)-methane or 2-(2H-benzotriazole-2-yl)-4,6-bis-(1-methyl-1-phenyl ethyl) phenol.

5. A multi-layered plastic sheet according to claim 1, wherein said mixture comprises about 95–70 mole % ethylene glycol and about 5–30 mole % 1,4-cyclohexane dimethanol.

6. A multi-layered plastic sheet according to claim 1, wherein said UV light-absorbing additive is a benzotriazole compound or a benzophenone compound.

7. A multi-layered plastic sheet according to claim 1, wherein said UV light absorbing additive is a benzotriazole compound having two benzotriazole groups in each molecule.

8. A multi-layered plastic sheet according to claim 1, wherein a second layer covers each of said first and said second surfaces of said first layer.

9. A multi-layered plastic sheet according to claim 1, wherein said second layer contains between about 1 wt. % and about 15 wt. % said UV light-absorbing additive.

10. A multi-layered plastic sheet according to claim 1, wherein said second layer contains between about 2 wt. % to about 10 wt. % of said UV-light absorbing additive.

11. A multi-layered plastic sheet according to claim 1, wherein said second layer contains between about 0.5 wt. % to about 20 wt. % of said UV-light absorbing additive.

12. A multi-layered plastic sheet according to claim 1, wherein said UV light-absorbing additive is at least one selected from the group consisting of a 2-hydroxyphenyl benzotriazole represented by formula (1)

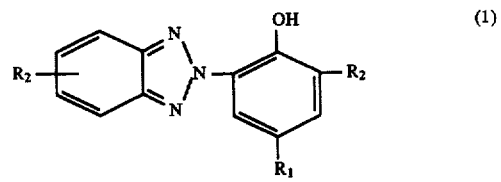

wherein $R_1$ is an alkyl group containing 1–18 carbon atoms or an aryl group containing 18 carbon atoms, $R_2$ is a hydrogen atom, a chlorine atom, an alkyl group containing 1–18 carbon atoms, or a aryl group containing 7–18 carbon atoms;

a benzophenone represented by formula (2)

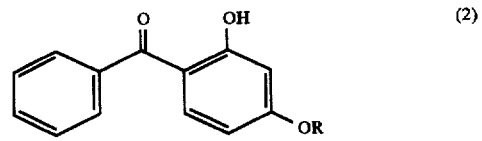

wherein R is a hydrogen atom or an alkyl group containing 1–12 carbon atoms; and a benzotriazole group represented by formula (3)

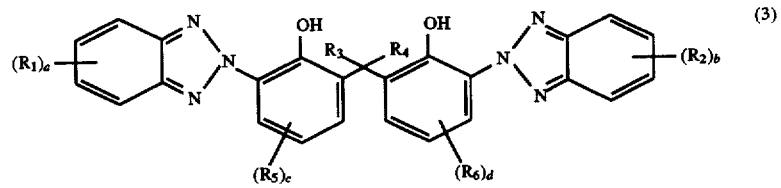

wherein $R_1$ and $R_2$, which can be the same or different, are a hydrogen atom, a halogen atom, an alkyl group containing 1–10 carbon atoms, a cycloalkyl group containing 5–10 carbon atoms, an aryl alkyl group containing 7–13 carbon atoms, an aryl group containing 6–14 carbon atoms, —$OR_7$ or —$COOR_7$, wherein $R_7$ is a hydrogen atom, an alkyl group containing 1–10 carbon atoms, a cycloalkyl group containing 5–10 carbon atoms, an aryl alkyl group containing 7–13 carbon atoms, or an aryl group containing 6–14 carbon atoms, $R_3$ and $R_4$, which can be the same or different, are a hydrogen atom, an alkyl group containing 1–15 carbon atoms, a cycloalkyl group containing 5 or 6 carbon atoms, an aryl alkyl group containing 7–20 carbon atoms or an aryl group containing 6–14 carbon atoms, $R_5$ and $R_6$, which can be the same or different, are an alkyl group containing 2–15 carbon atoms, a cycloalkyl group containing 5–10 carbon atoms, an aryl alkyl group containing 7–20 carbon atoms, an aryl group containing 6–14 carbon atoms, —$OR_7$ or —$COOR_7$, a and b, which can be the same or different, are 1, 2, 3 or 4, and c and d, which can be the same or different, are 1, 2 or 3.

13. A multi-layered plastic sheet according to claim 12, wherein said second layer contains between about 2 wt. % to about 10 wt. % of said UV-light absorbing additive.

14. A multi-layered sheet according to claim 1, wherein said UV light-absorbing additive is bis-(2-hydroxy-5-t-octyl-3-(benzotriazole-2-yl)phenyl)-methane.

15. A multi-layered sheet according to claim 1, wherein said UV light-absorbing additive is 2-(2H-benzotriazole-2-yl)-4,6-bis-(1-methyl-1-phenyl ethyl)phenol.

16. A shaped article which is formed at least in part from the multi-layered plastic sheet according to any one of claims 1, 2, 3, 5, 6, 7, 8, 10, 11 or 12.

17. A process for the production of a multi-layered plastic sheet according to claim 11, said process comprising coextruding said first layer and said second layer.

18. A multi-layered plastic sheet comprising a first layer having a first and second surface, wherein said first layer comprises a copolymer which is prepared by the reaction of dimethyl terephthalate or terephthalic acid with a mixture comprising about 95–70 mole % ethylene glycol and about 5–30 mole % 1,4-cyclohexane dimethanol, and a second layer which covers at least the first surface of said first layer, wherein said second layer comprises said copolymer of said first layer and a UV-absorbing additive comprising of a benzotriazole compound or a benzophenone compound, wherein said second layer has a thickness between about 2 μm and about 100 μm and wherein said second layer contains between 1 wt. % and about 15 wt. % UV-absorbing additive.

19. A process for producing a multi-layered plastic sheet, said process comprising extruding or calendaring a plastic layer, wherein said plastic layer comprises a copolymer which is prepared from the reaction of dimethyl terephthalate or terephthalic acid with a mixture having between about 99–55 mole % ethylene glycol and about 1–45 mole % 1,4-cyclohexane dimethanol, and before said plastic layer cools down from the extruding step or calendaring step, pressing onto said plastic layer a film having a thickness between about 2 μm and about 100 μm, said film comprising said copolymer and a UV light-absorbing additive.

20. A multi-layered plastic sheet consisting essentially of a first layer having a first and a second surface, wherein said first layer consists essentially of a copolymer prepared by the reaction of dimethyl terephthalate or terephthalic acid with a mixture comprising about 99–55 mole % ethylene glycol and about 1–45 mole % 1,4-cyclohexane dimethanol, and a second layer which covers at least the first surface of said first layer, wherein said second layer comprises said copolymer of said first layer and a UV light-absorbing additive, wherein said second layer has a thickness between about 2 μm and about 100 μm, and wherein said multi-layered plastic sheet is obtained by the combination of steps which consists essentially of extruding or calendaring said first layer; and pressing onto said first layer said second layer before said first layer is allowed to cool down from said extruding or calendaring.

21. A multi-layered plastic sheet consisting essentially of a first layer having a first and a second surface, wherein said first layer consists essentially of a copolymer prepared by the reaction of dimethyl terephthalate or terephthalic acid with a mixture comprising about 99–55 mole % ethylene glycol and about 1–45 mole % 1,4-cyclohexane dimethanol, and a second layer which covers at least the first surface of said first layer, wherein said second layer comprises said copolymer of said first layer and a UV light-absorbing additive, wherein said second layer has a thickness between about 2 μm and about 100 μm, and wherein said multi-layered plastic sheet is obtained by co-extruding said first and said second layers.

* * * * *